(12) United States Patent
Wentink et al.

(10) Patent No.: US 9,426,763 B2
(45) Date of Patent: Aug. 23, 2016

(54) SYSTEMS AND METHODS FOR SYNCHRONIZING TIMING BETWEEN WIRELESS NETWORKING DEVICES

(71) Applicant: QUALCOMM Incorporated, San Diego, CA (US)

(72) Inventors: Maarten Menzo Wentink, Naarden (NL); Didier Johannes Richard Van Nee, Tull en 't Waal (NL); Carlos Horacio Aldana, Mountain View, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 107 days.

(21) Appl. No.: 14/253,842

(22) Filed: Apr. 15, 2014

(65) Prior Publication Data

US 2014/0314068 A1    Oct. 23, 2014

Related U.S. Application Data

(60) Provisional application No. 61/813,115, filed on Apr. 17, 2013.

(51) Int. Cl.
*H04W 56/00* (2009.01)
*H04J 3/06* (2006.01)
*H04W 36/00* (2009.01)

(52) U.S. Cl.
CPC ........... *H04W 56/001* (2013.01); *H04J 3/0667* (2013.01); *H04W 56/00* (2013.01); *H04W 36/00* (2013.01)

(58) Field of Classification Search
CPC .............................. H04J 3/0667; H04W 56/001
See application file for complete search history.

(56) References Cited

U.S. PATENT DOCUMENTS

| 2006/0029028 A1* | 2/2006 | Kim | H04W 84/12 370/338 |
| 2006/0221924 A1* | 10/2006 | Yang | H04W 74/0816 370/338 |
| 2008/0291883 A1* | 11/2008 | Seok | H04W 64/00 370/338 |
| 2009/0147768 A1* | 6/2009 | Ji | H04J 3/0664 370/350 |
| 2011/0026465 A1* | 2/2011 | Chen | H04W 74/0816 370/328 |
| 2011/0194542 A1* | 8/2011 | Kim | H04W 72/0453 370/338 |

(Continued)

FOREIGN PATENT DOCUMENTS

EP      2378822 A2    10/2011
WO    2011066564 A2    6/2011

OTHER PUBLICATIONS

Dai H., et al., "TSync: A Lightweight Bidirectional Time Synchronization Service for Wireless Sensor Networks", ACM SIGMOBILE Mobile Computing and Communications Review, 2 Penn Plaza, Suite 701—New York USA, vol. 8, No. 1, 1994, pp. 125-139, XP040176781.

(Continued)

*Primary Examiner* — Jae Y Lee
(74) *Attorney, Agent, or Firm* — Arent Fox LLP

(57) ABSTRACT

Systems and methods are provided for synchronizing a timing of one or more access points in an area. The systems and methods utilize a timestamp frame exchange between the one or more access points based on a timestamp refresh interval that is changed after each timestamp frame exchange is performed.

20 Claims, 12 Drawing Sheets

(56) References Cited

U.S. PATENT DOCUMENTS

| | | | |
|---|---|---|---|
| 2012/0120874 A1* | 5/2012 | McLaughlin | H04W 56/002 370/328 |
| 2013/0148639 A1* | 6/2013 | Gao | H04J 3/0641 370/336 |
| 2014/0286324 A1 | 9/2014 | Aldana et al. | |

OTHER PUBLICATIONS

International Search Report and Written Opinion—PCT/US2014/034388—ISA/EPO—Oct. 9, 2014.
Partial International Search Report—PCT/US2014/034388—ISA/EPO—Jul. 8, 2014.

* cited by examiner

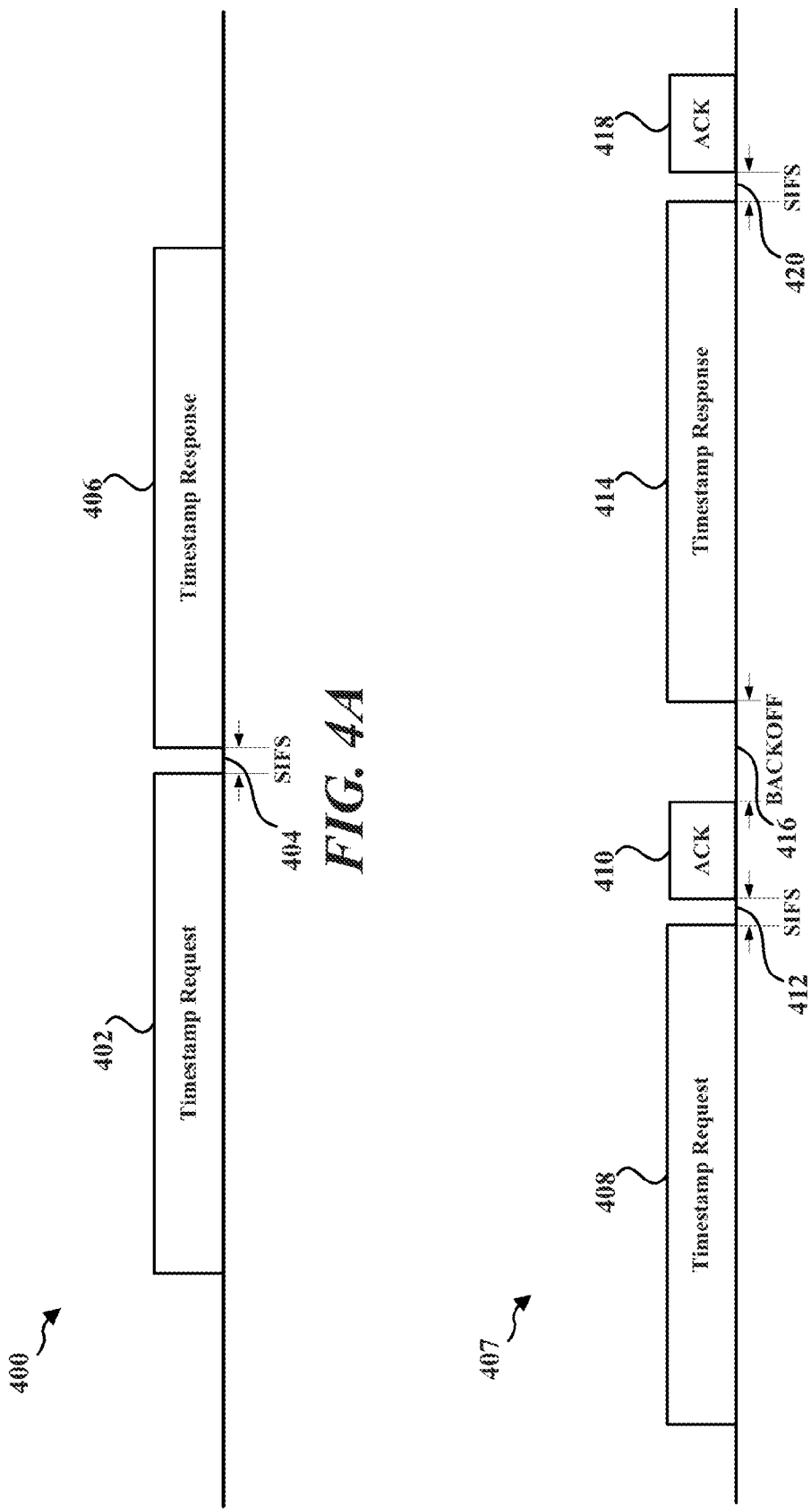

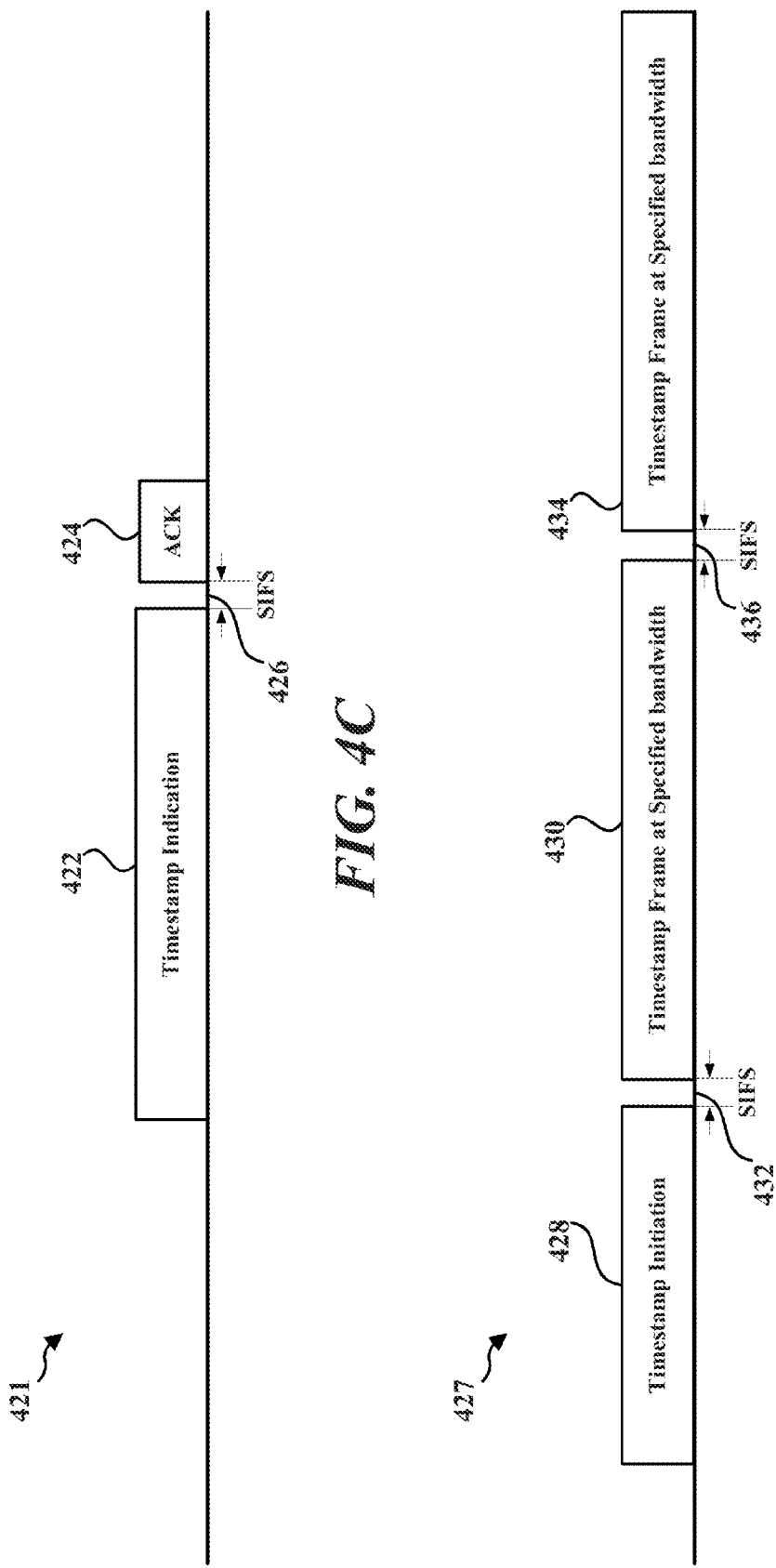

SYSTEMS AND METHODS FOR SYNCHRONIZING TIMING BETWEEN WIRELESS NETWORKING DEVICES

CROSS-REFERENCE TO RELATED APPLICATION(S)

This application claims the benefit of U.S. Provisional Application Ser. No. 61/813,115, entitled "SYSTEMS AND METHODS FOR SYNCHRONIZING TIMING BETWEEN WIRELESS NETWORKING DEVICES" and filed on Apr. 17, 2013, which is expressly incorporated by reference herein in its entirety.

BACKGROUND

1. Field

Embodiments disclosed herein are generally directed to systems and methods for synchronizing timing between wireless networking devices by exchanging frames including a timestamp.

2. Background

Wireless local area network (LAN) technology following the Institute of Electrical and Electronics Engineers (IEEE) 802.11 specification is commonly used for wireless connectivity amongst mobile computing devices due to its ability to economically satisfy the high bandwidth needs of the computing devices and the applications that run on the computing devices. According to the IEEE 802.11 specification (the "protocol"), a wireless Access Point (AP) may periodically transmit beacons that may include a timestamp field to other APs and/or network stations (STAs) to synchronize their local Timing Synchronization Function (TSF) timers with a TSF clock signal of the AP.

The timestamps transmitted by the APs may also be used for ranging, which is determining a position of an AP or STA by determining a round trip time or other timing value related to the transmission and reception of a timestamp by an AP. For certain types of ranging, it is desired that APs know the timing offsets of their own TSF timers and nearby APs. These timing offsets or timing delays may be periodically transmitted by an AP to nearby APs and STAs, and may be used by the STAs to determine a location relative to the transmitting AP.

Accordingly, there is a need for systems and methods for transmitting timestamps between APs and STAs that allow for nearby APs and STAs to determine a position with respect to the transmitting AP while maintaining a minimum of AP absence and traffic. In particular, there is a need for synchronizing the timing between APs and STAs that allow for minimal absences and collisions between the APs and STAs by randomly selecting new refresh intervals after each timestamp exchange.

SUMMARY

Consistent with some embodiments, there is provided a method for synchronizing a timing of a first device with a second device in communication with the first device. The method includes steps of determining, at the first device, if a timestamp refresh interval is expired, transmitting a timestamp request frame from the first device to the second device when the timestamp refresh interval expires, receiving, by the first device, a timestamp response frame, the timestamp response frame including a time value representative of an internal clock of the second device, updating a clock of the first device based on the time value, and selecting a new timestamp refresh interval.

Consistent with some embodiments, there is also provided a method for synchronizing a timing of a first device with a second device in communication with the first device. The method includes steps of determining, at the first device, if a timestamp refresh interval is expired, transmitting a timestamp indication frame from the first device to the second device when the timestamp refresh interval expires, the timestamp indication frame including a time value representative of an internal clock of the first device, receiving, by the first device, an acknowledgment frame from the second device, and selecting a new timestamp refresh interval.

Consistent with some embodiments, there is further provided a wireless access point. The wireless access point includes a wireless network interface configured to transmit a timestamp request frame when a timestamp refresh interval expires, and receive a timestamp response frame including a time value representative of an internal clock of a different wireless access point in response to the transmitted timestamp request frame. The wireless access point also includes one or more processors configured to determine when the timestamp refresh interval expires, update a local clock based on the time value, and select a new timestamp refresh interval. The wireless access point further includes a memory configured to store the time value.

BRIEF DESCRIPTION OF THE DRAWINGS

FIGS. 4A to 4D are examples of unicast frame exchanges between wireless communication devices, consistent with some embodiments.

Figure 1:
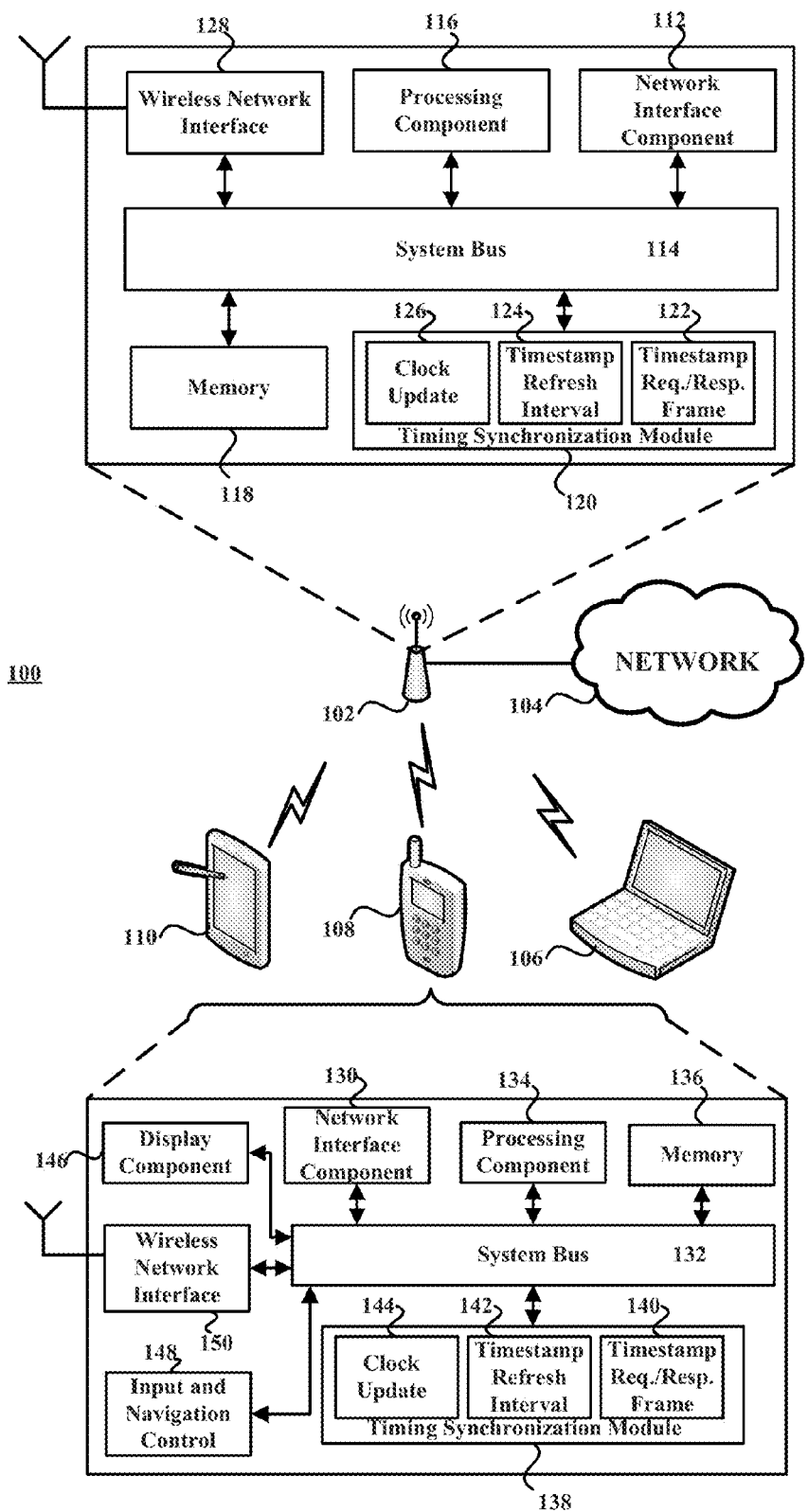
FIG. 1 illustrates a wireless local area network (WLAN), consistent with some embodiments.

In the drawings, elements having the same designation have the same or similar functions.

DETAILED DESCRIPTION

In the following description, specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 illustrates a wireless local area network (WLAN), consistent with some embodiments. As shown in FIG. 1, a network 100 includes an access point 102 in communication with a network 104. In some embodiments, network 104 may be the Internet. Access point 102 may be configured to provide wireless communications to mobile devices such as a laptop computer 106, a smart phone 108, and a tablet computer 110, such that these devices 106-110 may connect to network 104 through access point 102. Although not shown in FIG. 1, other devices, such as desktop computers, set-top boxes, video game consoles, and wireless televisions may connect to network 104 through access point 102 for wirelessly sending and receiving data. Devices 106-110 and other devices may be configured for communicating according to a 802.11 wireless standard, such as 802.11b, 802.11g, 802.11g, 802.11n, 802.11ac, and/or 802.11ad. According to some embodiments, access point 102 may be configured to provide additional wireless communication services, such as wireless fidelity (WiFi) services, worldwide interoperability for microwave access (WiMAX) services, and wireless session initiation protocol (SIP) services. Generally, devices 106-110 and other devices may be referred to as network stations or STAs.

Access point 102 includes a network interface component 112 configured for communication with network 104. Consistent with some embodiments, network interface component 302 may be configured to interface with a coaxial cable, a fiber optic cable, a digital subscriber line (DSL) modem, a public switched telephone network (PSTN) modem, an Ethernet device, and/or various other types of wired network communication devices. Access point 102 may also include a system bus 114 for interconnecting various components within access point 102 and communicating information between the various components. Such components include a processing component 116 which may be one or more processors, micro-controllers, digital signal processors (DSP), or graphics processors, and a memory component 118. Memory component 118 may correspond to random access memory (RAM), a read only memory (ROM), optical, magnetic, or solid-state memories, or any other type of memory.

Access point 102 may also include a timing synchronization module 120. Modules, such as timing synchronization module 120, may be software modules that perform a function when executed by processing component 116. In other embodiments, the modules may refer to an Application Specific Integrated Circuit (ASIC) or other circuit having memory at least one processor for executing instructions to perform a function. For example, timing synchronization module 120 may be capable of performing a timing synchronization function for synchronizing a clock time of access point 102 with other access points or any of stations 106-110. Timing synchronization module 120 may include a timestamp request and response frame generation module 122 capable of generating a timestamp request and/or response frame, a timestamp refresh interval module 124 capable of selecting a new timestamp refresh interval, and a clock update module 126 capable of updating a system clock based on a time value received from a timestamp refresh frame or timestamp indication frame.

Access point may also include a wireless network interface 128. In some embodiments, wireless network interface 128 and network interface component 112 may include various components configured to transmit and/or receive information over a network. Such components may include components that can communicate with both inputs and outputs, for example, a modulator/demodulator, wireless radio frequency (RF) transceivers, a telephonic interface, a bridge, a router, and/or network card. The components may be used to communicate connect device 106-110 to network 104. Wireless network interface 128 may enable transmitting and receiving information according to wireless network protocols, such as Wi-Fi™, 3G, 4G, HDSPA, LTE, RF, NFC, IEEE 802.11a, b, g, n, ac, or ad, Bluetooth®, WiMAX, ZigBee®, etc.

Devices or stations 106-110 may include a network interface component 130 configured for communication with a network. Consistent with some embodiments, network interface component 130 may be configured to interface with a coaxial cable, a fiber optic cable, a digital subscriber line (DSL) modem, a public switched telephone network (PSTN) modem, an Ethernet device, and/or various other types of wired network communication devices. A station may also include a system bus 132 for interconnecting various components within the station or device and communicating information between the various components. Such components include a processing component 134, which may be one or more processors, micro-controllers, digital signal processors (DSP), or graphics processors, and a memory component 136. Memory component 118 may correspond to random access memory (RAM), a read only memory (ROM), optical, magnetic, or solid-state memories, or any other type of memory.

The stations may also include a timing synchronization module 138. capable of performing a timing synchronization function for synchronizing a clock time a station with access point 102 or any of stations 106-110. Timing synchronization module 138 may include a timestamp request and response frame generation module 140 capable of generating a timestamp request and/or response frame, a timestamp refresh interval module 142 capable of selecting a new timestamp refresh interval, and a clock update module 144 capable of updating a system clock based on a time value received from a timestamp refresh frame or timestamp indication frame.

Consistent with some embodiments, a station may optionally include a display component 146 for displaying information to a user. Display component 146 may be a liquid crystal display (LCD) screen, an organic light emitting diode (OLED) screen (including active matrix AMOLED screens), an LED screen, a plasma display, or a cathode ray tube (CRT) display. A station may also include an optional input and navigation control component 148, allowing for a user to input information and navigate along display component 146. An input and navigation control component 148 may include, for example, a keyboard or key pad, whether physical or virtual, a mouse, a trackball, or other such device, or a capacitive sensor based touch screen. A station may also include a wireless network interface 150. In some embodiments, wireless network interface 150 and network interface component 130 may include various components configured to transmit and/or receive information over a network. Such components may include components that can communicate with both inputs and outputs, for example, a modulator/demodulator, wireless radio frequency (RF) transceivers, a telephonic interface, a bridge, a router, and/or network card. The components may be used to communicate with access point 102 shown in FIG. 1 for connecting to network 104. Wireless network interface 150 may enable transmitting and receiving information according to wireless network protocols, such as Wi-Fi™, 3G, 4G, HDSPA, LTE, RF, NFC, IEEE 802.11a, b, g, n, ac, or ad, Bluetooth®, WiMAX, ZigBee®, etc.

Figure 2:
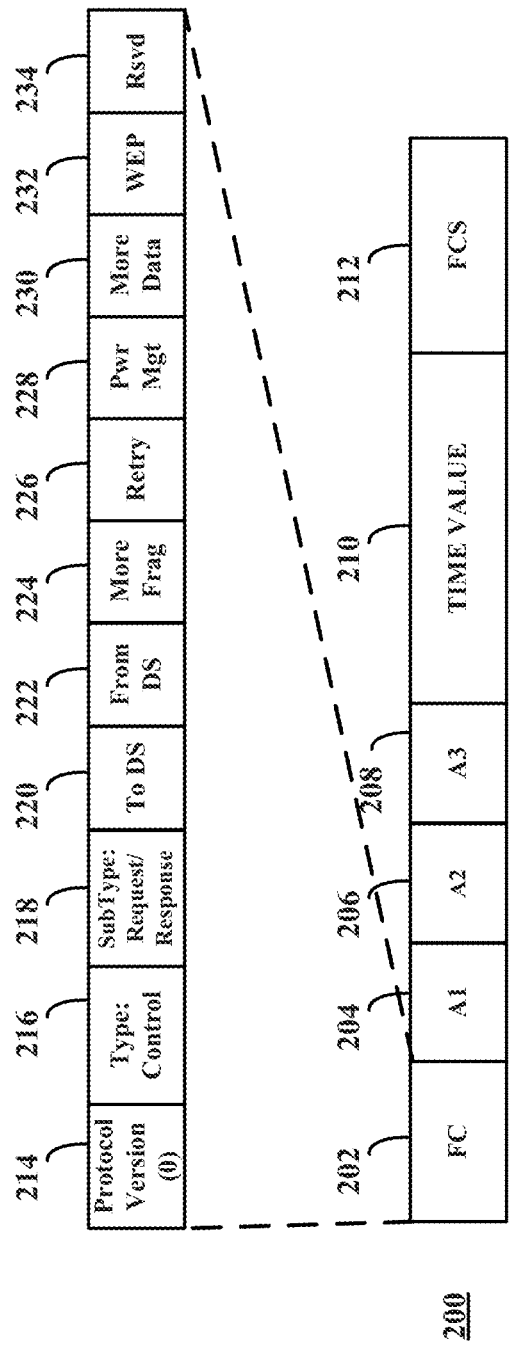
FIG. 2 is a diagram illustrating an IEEE 802.11 frame, according to some embodiments.

FIG. 2 is a diagram illustrating an IEEE 802.11 frame, according to some embodiments. In some embodiments, user datagram protocol (UDP) may be used for communicating information between access point 102 and stations or devices 106-110 and network 104. A UDP packet encapsulated as an IEEE 802.11 media access control (MAC) protocol data unit (MPDU) may be referred to as a UDP frame 200 or a MAC frame 200, or simply an IEEE 802.11 frame. As shown in FIG. 2, IEEE 802.11 frame 200 may include a frame control (FC) field 202 indicating, among other things, the frame type, and other information about frame 200. A plurality of address fields, A1, A2 and A3, may also be included. A first address field (A1) 204 may indicate a broadcast address or the address of an intended receiver. A second address field (A2) 206 may indicate the identification of the sender (e.g., the ID of access point 102). A third address field (A3) 208 may also include the sender's ID. A body 210 of frame 200 may include the specific data being transmitted for a data frame, or other information for other types of transmission frames. In some embodiments, the time value may be included in body 210 of frame 200. In some embodiments, the time value may be a 2-bit value. Frame 200 may conclude with a conventional frame check sequence (FCS) field 212.

As shown in FIG. 2, the frame control field 202 may include fields 214-234. Field 214 may designate a protocol version. Field 216 may designate a frame type. In some embodiments, a timestamp refresh and request frame including a time value may be a control type frame. A timestamp indication, and a timestamp frame may also be control type frames including a time value. Moreover, a timestamp initiation frame may also be a control type frame and include a specified bandwidth for transmitting a responsive timestamp frame. Body frame 210 in a control frame may have bits available. Consequently, the time value or the specified bandwidth can be included in body frame 210 as a payload. Field 218 may designate a frame subtype, such as a timestamp request, timestamp response, or timestamp indication. Field 220 and 222 may indicate if frame 200 is destined to or from a distribution system (DS). Field 224 may indicate whether there are any non-final fragments of a fragmented frame. Frame 226 may indicate if the frame is being retransmitted. Frame 228 may indicate power management, such as whether or not a sending device is in a power-saving mode. Field 230 may indicate whether frames (data) are being buffered from a distribution system towards stations that are in a power-saving mode. A wired equivalent privacy (WEP) frame 232 may indicate whether the frame is encrypted. Frame 234 may be reserved, such as for an Order bit indicating whether fragments and frames are transmitted in order.

Figure 3:
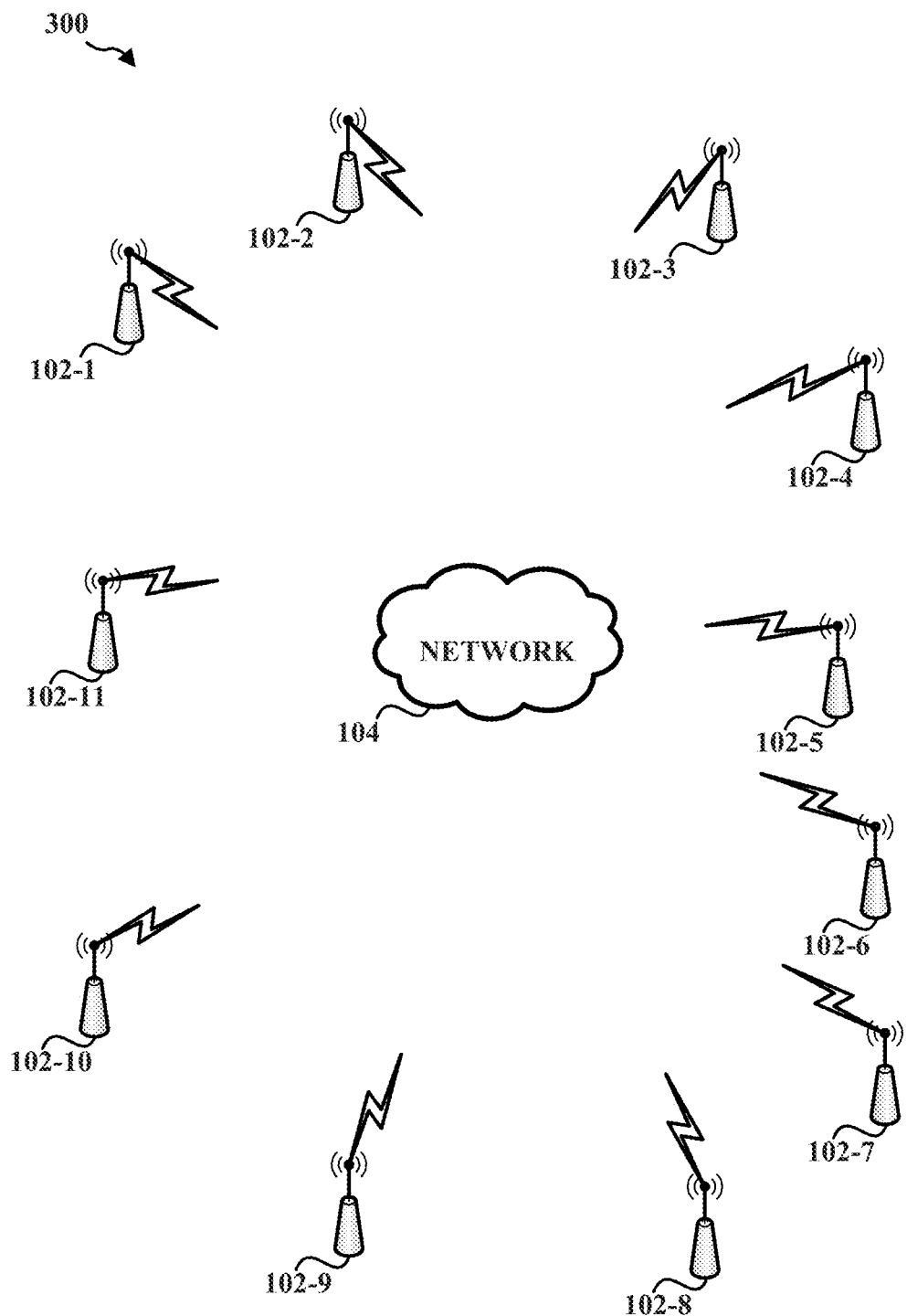
FIG. 3 is a diagram illustrating a plurality of access points in wireless communication with a network, consistent with some embodiments.

FIG. 3 is a diagram illustrating a plurality of access points in wireless communication with a network, consistent with some embodiments. As shown in FIG. 3, a plurality of access points 102-1 to 102-11 (collectively referred to as access point 102 or access points 102) may be in wireless communication with a network 104. Each of access points 102-1 to 102-11 may be in wireless communication with computing devices, such as devices 106, 108, and 110 shown in FIG. 1. As noted above, access points 102-1 to 102-11 may transmit a timestamp and/or a timing offset or delta to other access nearby access points 102-1 to 102-11 to synchronize a timing of the access points 102-1 to 102-11.

FIGS. 4A to 4D are examples of unicast frame exchanges between wireless communication devices, consistent with some embodiments. FIG. 4A is a diagram 400 illustrating an exchange of a timestamp request frame and a time response frame. FIG. 4B is a diagram 407 illustrating an exchange of a timestamp request frame and a timestamp response frame.

The exchange of request and response frames shown in FIGS. 4A and 4B may be referred to as an active frame exchange. As shown in FIG. 4A, a first device may transmit a timestamp request frame 402 which may be received by a second device. After a short interframe space (SIFS) 404, the second device may transmit a timestamp response frame 406 to the first device. According to some embodiments, the first and second device may be access points or other network stations, such as devices 106, 108, and 110 shown in FIG. 1. According to the 802.11 standard, SIFS is the shortest of the interframe spaces (IFSs) between transmissions from different access points or stations. Typically, SIFS are used when stations have seized a medium and need to retain the medium for a duration of the frame exchange sequence to be performed. Using a smallest gap between transmissions within the frame exchange sequence prevents other stations, which are required to wait for the medium to be idle for a longer gap, from attempting to use the medium, thus giving priority to completion of the frame exchange sequence in progress.

As shown in FIG. 4B, a first device may transmit a timestamp request frame 408 to a second device. The second device may then transmit an acknowledgment (ACK) frame 410 to the first device after a SIFS 412. The second device may then transmit a timestamp response frame 414 after another space 416. In some embodiments, the space may be a backoff, while in other embodiments, the space may be a point control function (PCF) interframe space (PIFS). After receiving timestamp response frame 414, the first device may then send an acknowledgement 418 to the second device after a SIFS 420.

According to some embodiments, timestamp request frame 402 or 408 may include the time value of the internal clock at a defined point in timestamp request frame 402 or 408. In some embodiments, the defined point may be the start or end of the symbol that contains the start or end of the timestamp, or the start or end of the timestamp request frame 402 or 408. In some embodiments, the time value may be in body 210 of frame 200, such as shown in FIG. 2. In some embodiments, timestamp response frame 406 or 414 may also include the time value of the internal clock at a defined point of the timestamp response frame 406 or 414. Similar to the case of the timestamp requests, the defined point may be the start or end of the symbol that contains the start or end of the timestamp, or the start or end of the timestamp response frame 406 or 414. In some embodiments, the time value may be in body 210 of frame 200, such as shown in FIG. 2.

In some embodiments, the first device and the second device are access points 102, such as shown in FIG. 3. In such embodiments, access points 102 may be assumed to know their relative location, so that the time delay between nearby access points 102 are known. Consequently, each access point 102 may periodically receive a timestamp from each nearby access point. The timestamp may be a timestamp request frame 402 or 408 or a timestamp response frame 406 or 414 received from each of the nearby access points 102. From the request and refresh frames, a time value may be provided to a first access point which may be used to determine a delta between a clock of the first access point and a clock of a second access point. The time value may also be used for synchronizing the first access point clock to the second access point clock and/or other timing related purposes. For example, access point 102-1 may send a timestamp request frame 402 or 408 to access point 102-2. After a SIFS 404 or sending an ACK 410, access point 102-2 may send a time stamp response frame 406 or 414 that may include a time value in body 210. Clock update module 126 of access point 102-1 may then determine the delta based on the received time value and update the internal clock of access point 102-1 and/or perform other timing-related activities.

The interval at which the timestamp needs to be refreshed may be referred to as a timestamp refresh interval. According to some embodiments, to refresh each timestamp every timestamp refresh interval, each access point 102 may schedule the transmission of timestamp request frames 402 and 408 to every other access point 102 at some time during the timestamp refresh interval. In some embodiments, the scheduled time may be a random time. In some embodiments, a timestamp refresh interval module 124 may be configured to schedule a timestamp refresh every x milliseconds (ms), wherein x is a random number between 1 and 1000, and x is uniformly chosen as an integer between 1 and 1000. In some embodiments, x may be determined based on an exponential distribution.

When an access point 102 receives a timestamp request frame 402 or 408 from another access point 102, the scheduled transmission of a timestamp request frame 402 or 408 to that particular access point 102 may be canceled for a corresponding timestamp refresh interval. Consequently, each access point 102 may receive a timestamp request frame 402 or 408 from half of the other access points 102 and send a timestamp request frame 402 or 408 to the other access points 102. As an example, for a system having n access points, there may be (n−1)/2 timestamp request frames 402 or 408 received and (n−1)/2 timestamp request frames 402 or 408 transmitted, on average during a timestamp refresh interval. However, since access points 102 may be on different channels, an access point 102 transmitting a timestamp request frame 402 or 408 may need to switch to a channel on which a receiving access point 102 will receive the timestamp request frame 402 or 408 to successfully transmit the frame. As a result, the periods of time during which an access point 102 leaves an operating channel to transmit a timestamp request frame 402 or 408, referred to as an absence, may be up to (n−1)/2 frames.

Referring again to FIG. 3, which includes 11 access points 102, on average there may be 5 timestamp request frames 402 or 408 received per access point 102, and 5 absences per access point 102 per timestamp refresh interval. Thus, for the system shown in FIG. 3, the number of absences per timestamp refresh interval may be (n−1)/2 on average, but may vary between 0 and n−1 per timestamp refresh interval, depending on the specific randomization during the interval. For example, the number of absences may vary between 0 and 10 per timestamp refresh interval for the system having 11 access points 102 shown in FIG. 3. Because two access points 102 may switch to the other access point's channel at the same time, the time spent on the other channel waiting for a timestamp response frame 406 or 414 or an ACK frame 410 or 416 may be limited to prevent access points 102 from waiting for each other indefinitely.

The time between successive transmissions of a timestamp request frame 402 or 408 to the same access point 102 may be selected randomly between a lower and upper limit. In some embodiments, the time may be selected once a new access point 102 is added, or the time may be selected randomly after each timestamp exchange with the access point 102. For example, the timestamp refresh interval selected for the access point 102 may be every x milliseconds, wherein x may be randomly chosen as an integer between 1 and 1000 or randomly chosen based on an exponential distribution. In some embodiments, selecting a random timestamp refresh interval after each timestamp exchange with a specific access point 102 has the advantage that an access point's travel to another channel may be distributed evenly between the access points 102 for the operating time of the access points 102. In some embodiments, when the interval is selected randomly only once, a first access point 102 having the shorter timestamp refresh interval may move to the channel of a second access point 102 during the operating time of the first access point 102. While this provides more predictability in scheduling absences, it may be problematic for devices 106, 108, or 110 communicating with the first access point 102 since the first access point 102 is spending a majority of its operating time on a different channel.

FIG. 4C is a diagram 421 illustrating a timestamp indication frame 422 sent by a first access point 102 and an ACK frame 424 sent in response after a SIFS 426. Synchronizing timestamps across a system of access points 102 using the method shown in FIG. 4C using only the timestamp indication frame 422 may require every access point 102 to potentially move to the channel of every other access point 102 to transmit the timestamp indication frame 422. Thus, for n access points 102, the number of absences may be n−1 and the number of transmitted timestamp indication frames 422 may also be n−1. For example, in the system shown in FIG. 3, if 11 access points 102 are each on different channels, there exist 10 absences and 10 transmitted timestamp indication frames 422 per access point 102 per timestamp refresh interval. In some embodiments, the timestamp indication frame 422 may be configured similarly to timestamp request frames 402 or 406 and timestamp response frames 408 or 414. That is, the timestamp indication frame 422 may also be similar to frame 200 having a time value in a body 210 thereof.

FIG. 4D is a diagram 427 illustrating a timestamp initiation frame 428 sent by a first access point 102. In some embodiments, the timestamp initiation frame 428 may be sent at a first bandwidth supported by the first access point 102 and any other access point 102, and may specify a bandwidth for responding with a time value in a timestamp frame. In some embodiments, the specified bandwidth may be wider than the bandwidth at which the timestamp initiation frame 428 is sent. A wider bandwidth for the timestamp frame allows for a recipient of the timestamp frame to more accurately determine the timestamp. For example, the timestamp initiation frame 428 may be sent at 20 MHz, but may specify that a responding timestamp frame be sent at 80 MHz to allow for greater accuracy. In some embodiments, the bandwidth specification may be included in the body 210 of the timestamp initiation frame 428.

A second access point 102 or other device may then transmit a responsive timestamp frame at the specified bandwidth 430 after a SIFS 432. The first access point may send its own timestamp frame at the specified bandwidth 434 after a SIFS 436. In some embodiments, timestamp frames 430 and 434 include time values representing internal clock values of respective transmitting devices. A time value may be included in a body 210 of timestamp frame 430 and timestamp frame 434.

Although FIGS. 4A to 4D demonstrate an active time synchronization method, in some embodiments, a passive method may also be applied. A passive synchronization method may include periodically broadcasting a timestamp by an access point 102, which is received by all access points 102 that have moved to or reside on the same channel of the transmitting access point 102. In the passive method, the number of transmitted timestamps may be one transmitted timestamp per access point per timestamp refresh interval. However, in the passive method for n access points 102, the number of absences may be n−1, which is higher than the on average (n−1)/2 absences for the active methods shown in FIGS. 4A and 4B.

For example, in the system of 11 access points 102 shown in FIG. 3, using a passive method, one timestamp may be transmitted per access point 102 with 10 absences per access point 102 per timestamp refresh interval. Moreover, in the passive method, it is possible that two access points select the same time to broadcast a respective timestamp frame. Although this issue may be reduced by selecting a fixed interval between successive broadcast transmissions randomly, such interval is fixed for the lifetime of the basic service set (BSS), but selected randomly at startup. A passive method is further described in U.S. patent application Ser. No. 14/212,849, by Carlos Aldana, filed on Mar. 14, 2014, and incorporated herein by reference in its entirety.

In some embodiments, the active method shown in FIGS. 4A to 4C may have advantages in that absences can be scheduled at an access point 102 more easily since they are not dependent on the timing at another access point 102. Moreover, a single absence can be used to refresh timestamps with all access points 102 on a channel when there are multiple access points 102 on a given channel that is different from the operating channel of the access point 102. As a result, the active methods shown in FIGS. 4A to 4C may be used for time synchronization between access points 102. On the other hand, a passive method such as described above may have an advantage in that it is more easily scalable to larger numbers of devices and thus may be used for time synchronization between network stations (STAs) associated with an access point 102, such as devices 106, 108, and 110.

Figure 5:
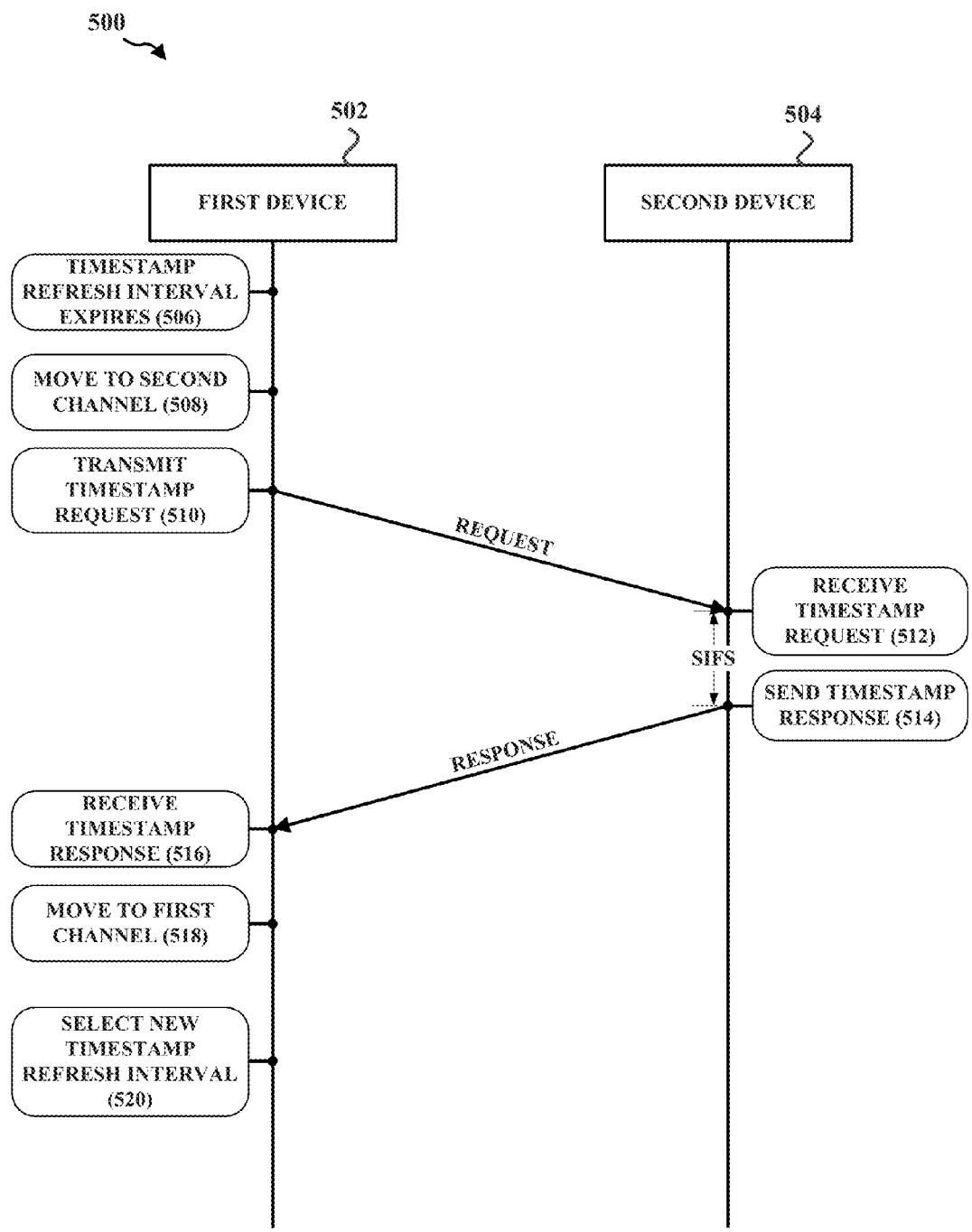
FIG. 5 is a flow diagram illustrating an example of a frame exchange between a first device and a second device, consistent with some embodiments.

FIG. 5 is a flow diagram 500 illustrating an example of a frame exchange between a first device 502 and a second device 504, consistent with some embodiments. In some embodiments, the first device 502 may correspond to an access point 102, such as shown in FIGS. 1 and 3 and the second device 504 may also correspond to an access point 102. In some embodiments, the first device 502 or the second device 504 may correspond to a network station (STA) such as devices 106, 108, and 110 shown in FIG. 1. Moreover, the frame exchange shown in FIG. 5 may correspond to the frame exchange example shown in FIG. 4A. As shown in FIG. 5, when a timestamp refresh interval expires at 506, the first device 502 may move to a second channel at 508. The second channel may be the channel on which the second device 504 is operating. At 510, the first device 502 may transmit a timestamp request. In some embodiments, the transmitted timestamp request frame may include the value of the internal clock of first device 502 at a defined point in the timestamp request frame. In some embodiments, the defined point may be the start or end of the symbol that contains the start or end of the timestamp, or the start or end of the timestamp request frame. In some embodiments, the time value may be in a body 210 of the timestamp request frame. At 512, the second device 504 may receive the timestamp request frame and update an internal clock or determine a clock difference based on the time value. At 514, after a SIFS, the second device 504 may send a timestamp response frame to the first device 502. The timestamp response frame may include the value of the internal clock of the second device 504 at a defined point of the timestamp response frame, wherein the defined point may be the start or end of the symbol that contains the start or end of the timestamp, or the start or end of the timestamp response frame. In some embodiments, the time value may be in a body 210 of the timestamp response frame. At 516, the first device 502 receives the timestamp response frame. At 518, after the first device 502 receives the timestamp response frame and updates an internal clock based on the time value, the first device 502 returns to the first channel. Thereafter, at 520, the first device 502 selects a new timestamp refresh interval. In some embodiments, the new timestamp refresh interval may be every x milliseconds, wherein x may be randomly chosen as an integer between 1 and 1000 or randomly chosen based on an exponential distribution.

Figure 6:
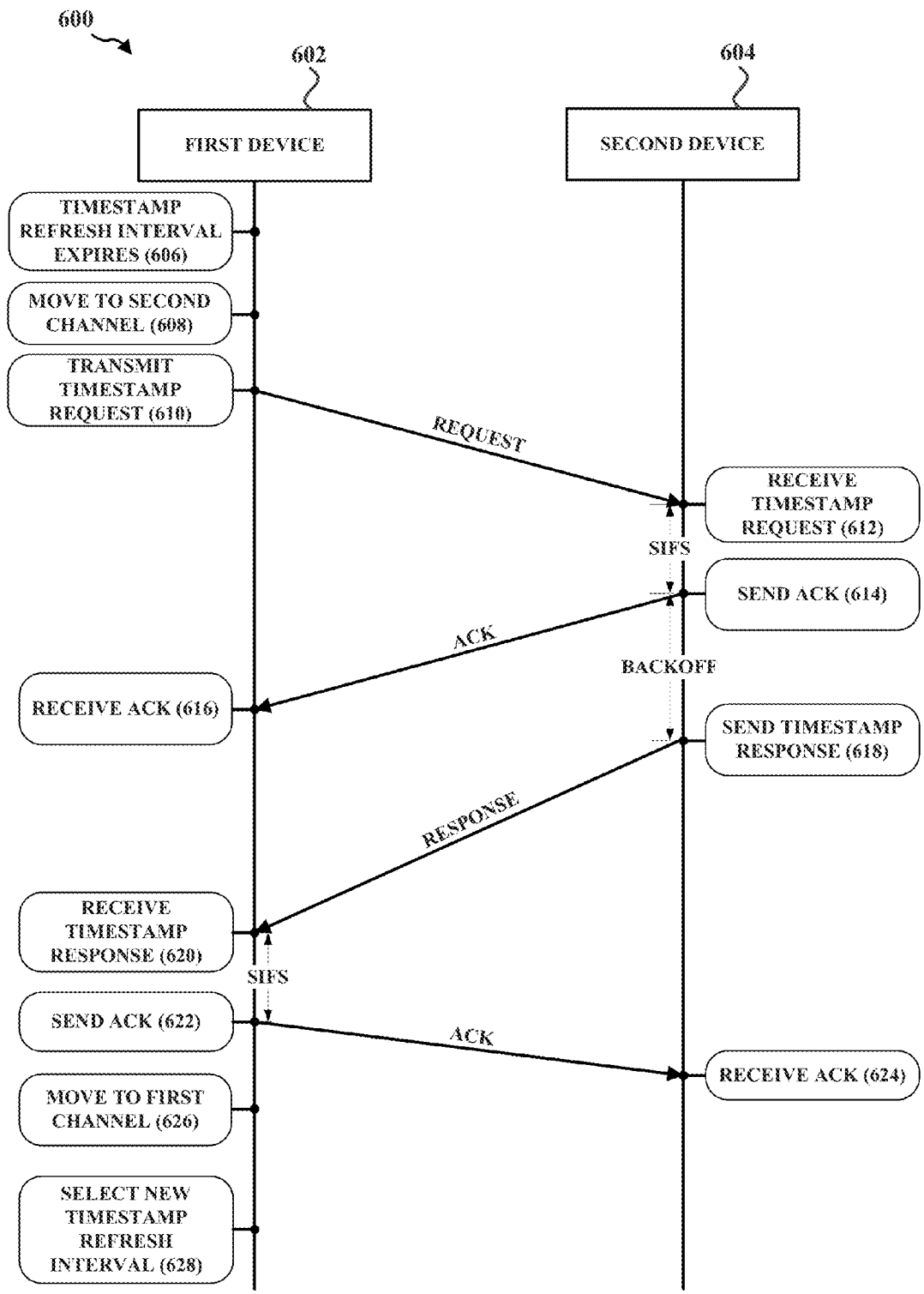
FIG. 6 is a flow diagram illustrating an example of a frame exchange between a first device and a second device, consistent with some embodiments.

FIG. 6 is a flow diagram 600 illustrating an example of a frame exchange between a first device 602 and a second device 604, consistent with some embodiments. In some embodiments, the first device 602 may correspond to an access point 102, such as shown in FIGS. 1 and 3, and the second device 604 may also correspond to an access point 102. In some embodiments, the first device 602 or the second device 604 may correspond to a network station (STA) such as devices 106, 108, and 110 shown in FIG. 1. Moreover, the frame exchange shown in FIG. 6 may correspond to the frame exchange example shown in FIG. 4B. As shown in FIG. 6, when a timestamp refresh interval expires at 606, the first device 602 may move to a second channel at 608. The second channel may be the channel on which the second device 604 is operating. At 610, the first device 602 may transmit a timestamp request frame. In some embodiments, the transmitted timestamp request frame may include the time value of the internal clock of the first device 602 at a defined point in the timestamp request frame. In some embodiments, the defined point may be the start or end of the symbol that contains the start or end of the timestamp, or the start or end of the timestamp request frame. In some embodiments, the time value may be included in a body 210 of the timestamp request frame. At 612, the second device 604 may receive the timestamp request and update an internal clock based on the time value and/or determine a difference between an internal clock value of the second device 604 and an internal clock value of the first device 602 based on the time value. At 614, after a SIFS, the second device 604 may send an acknowledgment frame (ACK). At 616, the first device 602 may receive the ACK. At 618, after a second period of time, which may be a backoff frame space, or a PIFS, the second device 804 may transmit a timestamp response frame to the first device 602. The timestamp response frame may include the time value of the internal clock of the second device 604 at a defined point of the timestamp response frame, wherein the defined point may be the start or end of the symbol that contains the start or end of the timestamp, or the start or end of the timestamp response frame. The time value may also be in a body 210 of the timestamp response frame. At 620, the first device 602 may receive the timestamp response frame and update an internal clock based on the time value and/or determine a difference between an internal clock value of the first device 602 and an internal clock value of the second device 604 based on the time value. At 622, the first device 602 may transmit an ACK frame after a SIFS. At 624, the second device 604 may receive the ACK. At 626, the first device 602 may return to the first channel and select a new timestamp refresh interval at 628. In some embodiments, the new timestamp refresh interval may be every x milliseconds, wherein x may be randomly chosen as an integer between 1 and 1000 or randomly chosen based on an exponential distribution.

Figure 7:
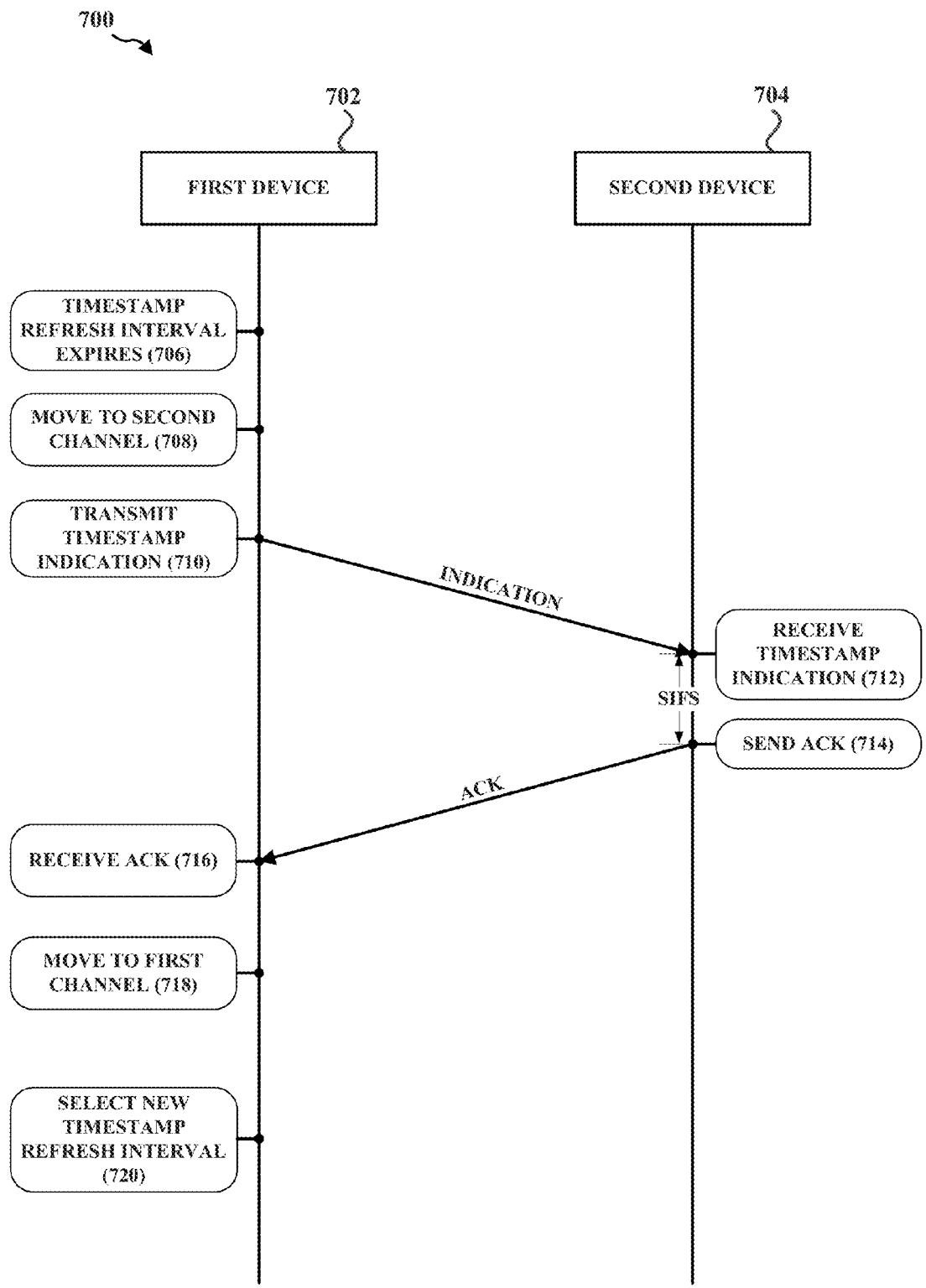
FIG. 7 is a flow diagram illustrating an example of a frame exchange between a first device and a second device, consistent with some embodiments.

FIG. 7 is a flow diagram 700 illustrating an example of a frame exchange between a first device 702 and a second device 704, consistent with some embodiments. In some embodiments, the first device 702 may correspond to an access point 102, such as shown in FIGS. 1 and 3 and the second device 704 may also correspond to an access point 102. In some embodiments, the first device 702 or the second device 704 may correspond to a network station (STA) such as devices 106, 108, and 110 shown in FIG. 1. Moreover, the frame exchange shown in FIG. 7 may correspond to the frame exchange example shown in FIG. 4C. As shown in FIG. 7, when a timestamp refresh interval expires at 706, the first device 702 may move to a second channel at 708. The second channel may be the channel on which the second device 704 is operating. At 710, the first device 702 may transmit a timestamp indication. The transmitted timestamp indication may include the time value of the internal clock of the first device 702 at a defined point in the timestamp request frame. In some embodiments, the defined point may be the start or end of the symbol that contains the start or end of the timestamp, or the start or end of the timestamp indication frame. The time value may also be included in a body 210 of the timestamp indication frame. At 712, the second device 704 may receive the timestamp indication frame and update an internal clock based on the time value and/or determine a difference between an internal clock of the first device 702 and the internal clock of the second device 704. At 714, after a SIFS, the second device 704 may send an acknowledgment frame (ACK). At 716, the first device 702 may receive the ACK. At 718, the first device 702 may return to the first channel and select a new timestamp refresh interval at 720. In some embodiments, the new timestamp refresh interval may be every x milliseconds, wherein x may be randomly chosen as an integer between 1 and 1000 or randomly chosen based on an exponential distribution.

Figure 8:
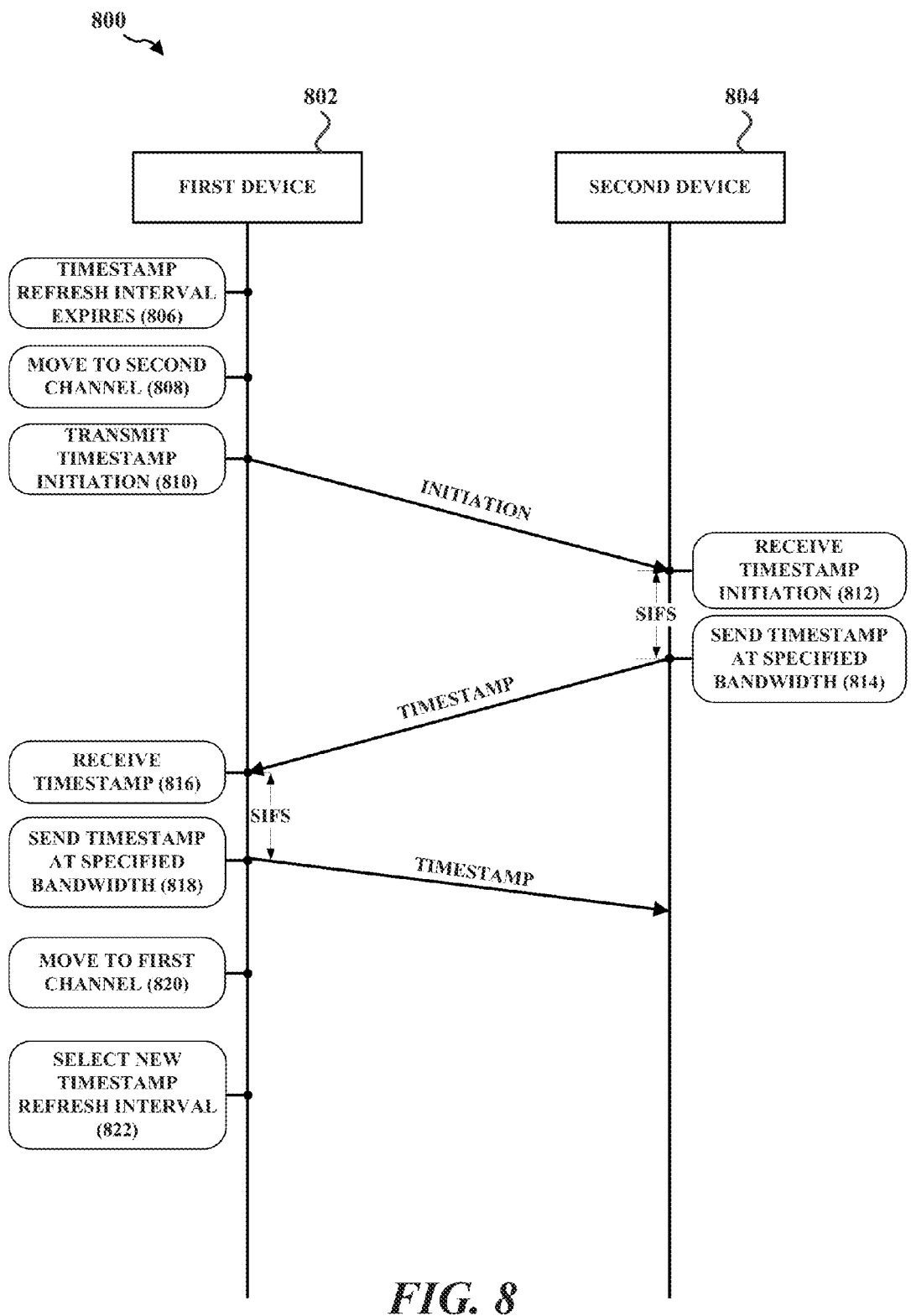
FIG. 8 is a flow diagram illustrating an example of a frame exchange between a first device and a second device, consistent with some embodiments.

FIG. 8 is a flow diagram 800 illustrating an example of a frame exchange between a first device 802 and a second device 804, consistent with some embodiments. In some embodiments, the first device 802 may correspond to an access point 102, such as shown in FIGS. 1 and 3, and the second device 804 may also correspond to an access point 102. In some embodiments, the first device 802 or the second device 804 may correspond to a network station (STA) such as devices 106, 108, and 110 shown in FIG. 1. Moreover, the frame exchange shown in FIG. 8 may correspond to the frame exchange example shown in FIG. 4D. As shown in FIG. 8, when a timestamp refresh interval expires at 806, the first device 802 may move to a second channel at 808. The second channel may be the channel on which the second device 804 is operating. At 810, the first device 802 may transmit a timestamp initiation frame. The timestamp initiation frame may be sent at any bandwidth supported by the first device 802 and the second device 804. Moreover, in some embodiments, the transmitted timestamp initiation frame may include a specified bandwidth at which a responsive timestamp frame is to be transmitted. In some embodiments, the specified bandwidth may be included in a body 210 of the timestamp initiation frame. At 812, the second device 804 may receive the timestamp initiation. At 814, after a SIFS, the second device 804 may transmit a timestamp frame at the specified bandwidth to the first device 802. The timestamp frame may include the time value of the internal clock of the second device 804 at a defined point of the timestamp response frame, wherein the defined point may be the start or end of the symbol that contains the start or end of the timestamp, or the start or end of the timestamp response frame. The time value may also be in a body 210 of the timestamp frame. At 816, the first device 802 may receive the timestamp frame and update an internal clock based on the time value and/or determine a difference between an internal clock value of the first device 802 and an internal value of the second device 804 based on the time value.

At 818, after a SIFS, the first device 802 may transmit a timestamp frame at the specified bandwidth to the second device 804. The timestamp frame may include the time value of the internal clock of the first device 804 at a defined point of the timestamp response frame, wherein the defined point may be the start or end of the symbol that contains the start or end of the timestamp, or the start or end of the timestamp response frame. The time value may also be in a body 210 of the timestamp frame. At 820, the first device 802 may return to the first channel and select a new timestamp refresh interval at 822. In some embodiments, the new timestamp refresh interval may be every x milliseconds, wherein x may be randomly chosen as an integer between 1 and 1000 or randomly chosen based on an exponential distribution.

Figure 9:
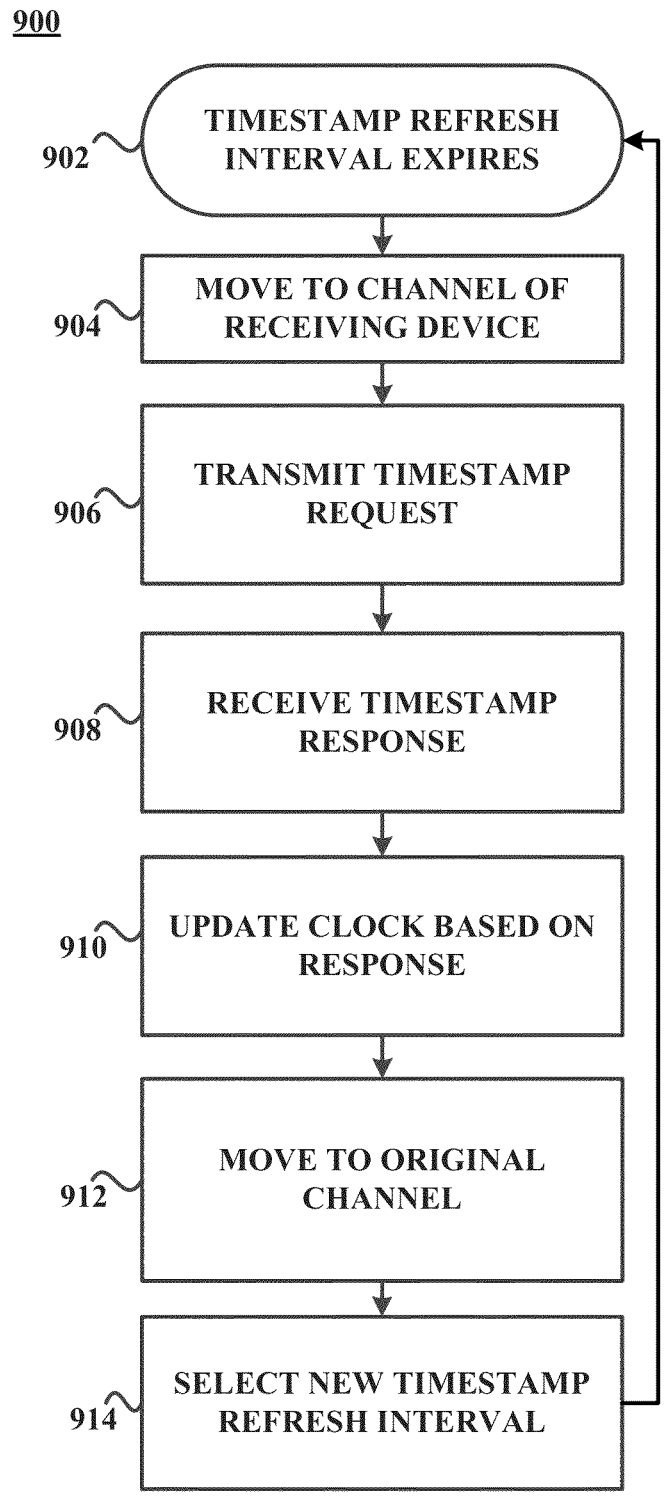
FIG. 9 is a flowchart illustrating a process for updating a timestamp of a nearby device, consistent with some embodiments.

FIG. 9 is a flowchart illustrating a process for updating a timestamp of a nearby device, consistent with some embodiments. For the purpose of illustration, FIG. 9 will be described with reference to any of FIG. 1-3, 4A, or 5. The process 900 shown in FIG. 9 may be embodied in computer-readable instructions for execution by one or more processors in processing component 116 of access point 102, or may be performed by one or more modules in timing synchronization module 120. In some embodiments, process 900 may be implemented by an operating system of access point 102 stored in memory 118 and executed by processing component 116. In some embodiments, process 900 may be implemented as a background service in the operating system. As shown in FIG. 9, process 900 when processing component 116 determines that a timestamp refresh interval has expired (902), processing component 116 may instruct wireless network interface 128 and/or network interface component 112 to move from a current channel to a channel on which a receiving device is currently active (904). Wireless network interface 128 may then transmit a timestamp request (906). In some embodiments, the timestamp refresh interval may be randomly selected. Moreover, the transmitted timestamp request frame may include the time value of the internal clock of access point 102 at a defined point in the timestamp request frame. In some embodiments, the defined point may be the start or end of the symbol that contains the start or end of the timestamp, or the start or end of the timestamp request frame. In some embodiments, the time value may be included in body 210 of the timestamp request frame. The timestamp request frame may be generated by timestamp refresh request/response module 122 alone or in combination with processing component 116.

Returning to FIG. 9, wireless network interface 128 may then receive a timestamp response frame (908). The timestamp response frame may include the time value of the internal clock of a second device or access point 102 at a defined point of the timestamp response frame, wherein the defined point may be the start or end of the symbol that contains the start or end of the timestamp, or the start or end of the timestamp response frame. The time value may also be included in body 210 of the timestamp response frame. The time value may be representative of a clock of the second device or access point 102 and may be used to update the clock of access point 102 (910). In some embodiments, clock update module 126 may update the clock of access point 102 based on the received time value. Wireless network interface 128 may then return to the original channel (912). Timestamp refresh interval module 124, alone or in combination with processing component 116, may then select a new timestamp refresh interval (914). Process 900 may then repeat each time the timestamp refresh interval expires.

Figure 10:
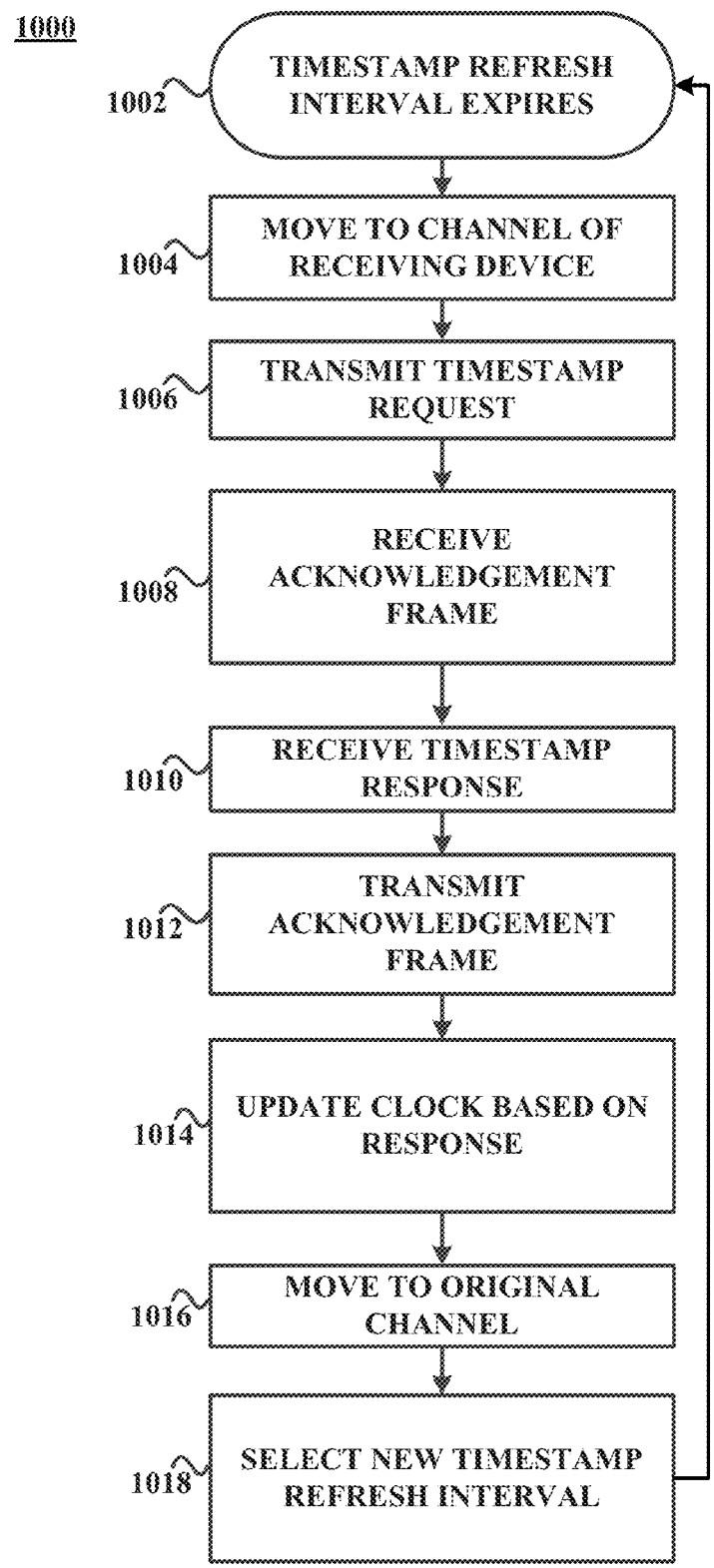
FIG. 10 is a flowchart illustrating a process for updating a timestamp of a nearby device, consistent with some embodiments.

FIG. 10 is a flowchart illustrating a process for updating a timestamp of a nearby device, consistent with some embodiments. For the purpose of illustration, FIG. 10 will be described with reference to any of FIG. 1-3, 4B, or 6. The process 1000 shown in FIG. 10 may be embodied in computer-readable instructions for execution by one or more processors in processing component 116 of access point 102, or may be performed by one or more modules in timing synchronization module 120. In some embodiments, process 1000 may be implemented by an operating system of access point 102 stored in memory 118 and executed by processing component 116. In some embodiments, process 1000 may be implemented as a background service in the operating system. As shown in FIG. 10, when processing component 116 determines that a timestamp refresh interval has expired (1002), processing component 116 may instruct wireless network interface 128 and/or network interface 112 component to move from a current channel to a channel on which a receiving device is currently active (1004). Wireless network interface 128 may then transmit a timestamp request (1006). In some embodiments, the timestamp refresh interval may be randomly selected. Moreover, the transmitted timestamp request frame may include the time value of the internal clock of access point 102 at a defined point in the timestamp request frame. In some embodiments, the defined point may be the start or end of the symbol that contains the start or end of the timestamp, or the start or end of the timestamp request frame. The time value may also be included in body 210 of the timestamp request frame. The timestamp request frame may be generated by timestamp refresh request/response module 122 alone or in combination with processing component 116.

Returning to FIG. 10, wireless network interface 128 may then receive an acknowledgement frame (1008) followed by a timestamp response frame (1010). The timestamp response frame may include the value of the internal clock of a second device or access point 102 at a defined point of the timestamp response frame, wherein the defined point may be the start or end of the symbol that contains the start or end of the timestamp, or the start or end of the timestamp response frame. The time value may also be included in body 210 of the timestamp response frame. Upon receipt of the timestamp response frame, processing component 116 may instruct wireless network interface 128 to transmit an acknowledgment frame (1012). The time value may be representative of a clock of the second device or access point 102 and may be used to update the clock of access point 102 (1014) by clock update module 126 alone or in combination with processing component 116. Wireless network interface 128 may then return to the original channel (1016). Timestamp refresh interval module 124, alone or in combination with processing component 116, may then select a new timestamp refresh interval (1018). Process 1000 may then repeat each time the timestamp refresh interval expires.

Figure 11:
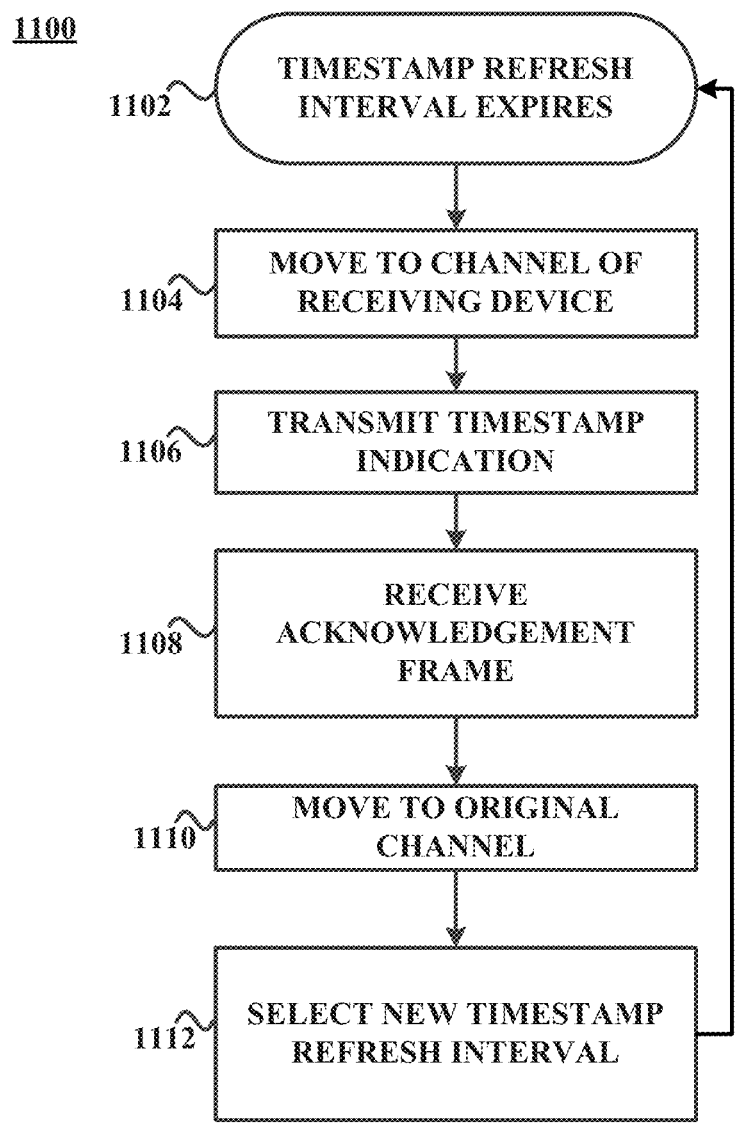
FIG. 11 is a flowchart illustrating a process for updating a timestamp of a nearby device, consistent with some embodiments.

FIG. 11 is a flowchart illustrating a process for updating a timestamp of a nearby device, consistent with some embodiments. For the purpose of illustration, FIG. 11 will be described with reference to any of FIG. 1-3, 4C, or 7. The process 1100 shown in FIG. 11 may be embodied in computer-readable instructions for execution by one or more processors in processing component 116 of access point 102, or may be performed by one or more modules in timing synchronization module 120. In some embodiments, process 1100 may be implemented by an operating system of access point 102 stored in memory 118 and executed by processing component 116. In some embodiments, process 1100 may be implemented as a background service in the operating system. As shown in FIG. 11, process 1100 when processing component 116 determines that a timestamp refresh interval has expired (1102), processing component 116 may instruct wireless network interface 128 and/or network interface 112 component to move from a current channel to a channel on which a receiving device is currently active (1104). Wireless network interface 128 may then transmit a timestamp indication frame (1106). In some embodiments, the timestamp refresh interval may be randomly selected. Moreover, the transmitted timestamp indication frame may include the time value of the internal clock of access point 102 at a defined point in the timestamp indication frame. In some embodiments, the defined point may be the start or end of the symbol that contains the start or end of the timestamp, or the start or end of the timestamp indication frame. The time value may also be included in body 210 of the timestamp indication frame. The timestamp indication frame may be generated by timestamp refresh request/response module 122 alone or in combination with processing component 116.

Returning to FIG. 11, wireless network interface 128 may then receive an acknowledgement frame (1108). Wireless network interface 128 may then return to the original channel (1110). Timestamp refresh interval module 124, alone or in combination with processing component 116, may then select a new timestamp refresh interval (1112). Process 1100 may then repeat each time the timestamp refresh interval expires.

At least some implementations described herein have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed. A process may correspond to a method, a function, a procedure, a subroutine, a subprogram, etc. When a process corresponds to a function, its termination may correspond to a return of the function to the calling function or the main function.

Moreover, embodiments described herein may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Consequently, embodiments as described herein may provide systems and methods for synchronizing timing between wireless networking devices by exchanging frames including a timestamp. In particular, systems and methods described herein may allow for the synchronization of timing between wireless networking devices that allow for minimal absences and collisions between the devices by randomly selecting new refresh intervals after each synchronization. One skilled in the art may readily devise other systems consistent with the disclosed embodiments which are intended to be within the scope of this disclosure.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for synchronizing a timing of a first device with a second device in communication with the first device, comprising:
    moving, by the first device, to a channel associated with the second device when a timestamp refresh interval expires;
    transmitting, by the first device, a timestamp request frame from the first device to the second device when the timestamp refresh interval expires;
    receiving, by the first device, a timestamp response frame, the timestamp response frame including a time value representative of an internal clock of the second device;
    updating, by the first device, a clock of the first device based on the time value in the timestamp response frame;
    moving, by the first device, to an original channel after receiving the timestamp response frame; and
    selecting, by the first device, a new timestamp refresh interval.

2. The method of claim 1, wherein the selecting the new timestamp refresh interval comprises randomly selecting the new timestamp refresh interval, wherein the new timestamp refresh interval is based on one of a uniform distribution or an exponential distribution.

3. The method of claim 1, wherein the first device and the second device comprise wireless access points.

4. The method of claim 1, wherein the receiving the timestamp response frame comprises receiving a frame including the time value of the internal clock of the second device at a start or end of a symbol that includes a start or end of a timestamp, or at a start or end of the timestamp response frame.

5. The method of claim 1, wherein the timestamp request frame specifies a bandwidth for transmitting the timestamp response frame.

6. The method of claim 1, further comprising transmitting an acknowledgment frame after receiving the timestamp response frame.

7. The method of claim 6, wherein the transmitting the acknowledgment frame comprises transmitting the acknowledgment frame a short interframe space (SIFS) after receiving the timestamp response frame.

8. A method for synchronizing a timing of a first device with a second device in communication with the first device, comprising:
    moving, by the first device, to a channel associated with the second device when a timestamp refresh interval expires;
    transmitting, by the first device, a timestamp indication frame from the first device to the second device when the timestamp refresh interval expires, the timestamp indication frame including a time value representative of an internal clock of the first device;
    receiving, by the first device, an acknowledgment frame from the second device;
    moving, by the first device, to an original channel after receiving the acknowledgment frame; and
    selecting, by the first device, a new timestamp refresh interval.

9. The method of claim 8, wherein the selecting the new timestamp refresh interval comprises randomly selecting the new timestamp refresh interval, wherein the new timestamp refresh interval is based on one of a uniform distribution or an exponential distribution.

10. The method of claim 8, wherein the first device and the second device comprise wireless access points.

11. A wireless access point, comprising:
a memory; and
at least one processor coupled to the memory and configured to:
determine when a timestamp refresh interval expires,
move to a channel associated with a different wireless access point based on the determination that the timestamp refresh interval has expired,
transmit a timestamp request frame when the timestamp refresh interval expires,
receive a timestamp response frame including a time value representative of an internal clock of a different wireless access point in response to the transmitted timestamp request frame,
store the time value,
update a local clock based on the time value in the timestamp response frame,
move to an original channel after receiving the timestamp response frame, and
select a new timestamp refresh interval.

12. The wireless access point of claim 11, wherein the one or more processors are further configured to randomly select the new timestamp refresh interval, wherein the new timestamp refresh interval is based on one of a uniform distribution or an exponential distribution.

13. The wireless access point of claim 11, wherein the timestamp request frame specifies a bandwidth for sending the timestamp response frame.

14. The wireless access point of claim 11, wherein the wireless network interface is further configured to receive the timestamp response frame by receiving a frame including the time value of the internal clock of the different wireless access point at a start or end of a symbol that includes a start or end of a timestamp, or at a start or end of the timestamp response frame.

15. The wireless access point of claim 11, wherein the wireless network interface is further configured to transmit an acknowledgment frame after receiving the timestamp response frame.

16. The wireless access point of claim 15, wherein the wireless network interface is configured to transmit the acknowledgment frame by transmitting the acknowledgment frame a short interframe space (SIFS) after receiving the timestamp response frame.

17. A wireless access point, comprising:
a memory; and
at least one processor coupled to the memory and configured to:
determine when a timestamp refresh interval expires,
move to a channel associated with a different wireless access point based on the determination that the timestamp refresh interval has expired,
transmit a timestamp indication frame to the different wireless access point when the timestamp refresh interval expires, the timestamp indication frame including a time value representative of an internal clock of the wireless access point,
receive an acknowledgment frame from the different wireless access point,
move to an original channel after receiving the acknowledgment frame, and
select a new timestamp refresh interval.

18. The wireless access point of claim 17, wherein the one or more processors are further configured to randomly selecting the new timestamp refresh interval, wherein the new timestamp refresh interval is based on one of a uniform distribution or an exponential distribution.

19. A first device for wireless communication, comprising:
a memory; and
at least one processor coupled to the memory and configured to:
move to a channel associated with a second device when a timestamp refresh interval expires;
transmit a timestamp request frame from the first device to the second device when the timestamp refresh interval expires;
receive, by the first device, a timestamp response frame, the timestamp response frame including a time value representative of an internal clock of the second device;
update a clock of the first device based on the time value in the timestamp response frame;
move to an original channel after receiving the timestamp response frame; and
select a new timestamp refresh interval.

20. A first device for wireless communication, comprising:
a memory; and
at least one processor coupled to the memory and configured to:
move to a channel associated with a second device when a timestamp refresh interval expires;
transmit a timestamp indication frame from the first device to the second device when the timestamp refresh interval expires, the timestamp indication frame including a time value representative of an internal clock of the first device;
receive, by the first device, an acknowledgment frame from the second device;
move to an original channel after receiving the acknowledgment frame; and
select a new timestamp refresh interval.

* * * * *